US00RE44781E

(19) United States
(12) Reissued Patent
Wilson et al.

(10) Patent Number: US RE44,781 E
(45) Date of Reissued Patent: Feb. 25, 2014

(54) SYSTEM AND METHOD FOR CALCULATING OPTIMAL RATES IN A MULTI-SOURCE PRICE ENGINE IN OVER THE COUNTER MARKETS

(75) Inventors: Kelly J. F. Wilson, Vancouver (CA); Cary D. Rosenwald, New York, NY (US); Sean M. Gilman, Rye, NY (US); Richard Hartheimer, Kilcock (IE)

(73) Assignee: Currenex, Inc., New York, NY (US)

(21) Appl. No.: 13/462,521

(22) Filed: May 2, 2012

Related U.S. Patent Documents

Reissue of:

(64) Patent No.: 7,627,520
Issued: Dec. 1, 2009
Appl. No.: 11/582,448
Filed: Oct. 18, 2006

U.S. Applications:

(62) Division of application No. 13/197,209, filed on Aug. 3, 2011.

(51) Int. Cl.
*G06Q 40/00* (2012.01)

(52) U.S. Cl.
USPC ..... 705/37; 705/35

(58) Field of Classification Search
USPC ..... 705/37
See application file for complete search history.

(56) References Cited

U.S. PATENT DOCUMENTS

| | | | | |
|---|---|---|---|---|
| 5,375,055 | A | 12/1994 | Togher et al. | |
| 6,014,627 | A | 1/2000 | Togher et al. | |
| 6,108,639 | A | 8/2000 | Walker et al. | |
| 6,347,307 | B1 | 2/2002 | Sandhu et al. | |
| 6,493,682 | B1 | 12/2002 | Horrigan et al. | |
| 6,944,599 | B1 | 9/2005 | Vogel et al. | |
| 6,985,883 | B1 | 1/2006 | Togher et al. | |
| 6,996,541 | B2 | 2/2006 | Togher et al. | |
| 7,003,488 | B2 | 2/2006 | Dunne et al. | |
| 7,024,386 | B1 | 4/2006 | Mills et al. | |
| 7,627,520 | B2 | 12/2009 | Wilson et al. | |
| 7,882,011 | B2 | 2/2011 | Sandhu et al. | |
| 2003/0033212 | A1 | 2/2003 | Sandhu et al. | |
| 2003/0208430 | A1* | 11/2003 | Gershon | 705/36 |
| 2005/0027634 | A1 | 2/2005 | Gershon | |
| 2005/0228741 | A1 | 10/2005 | Leibowitz | |
| 2006/0167783 | A1* | 7/2006 | Riseman et al. | 705/37 |
| 2011/0106688 | A1 | 5/2011 | Sandhu et al. | |

* cited by examiner

*Primary Examiner* — James A Vezeris
(74) *Attorney, Agent, or Firm* — Wilmer Cutler Pickering Hale and Dorr LLP

(57) ABSTRACT

A system and method calculate an optimal rates in a multi-source price engine in over the counter (OTC) markets. The system and method integrate rates from multiple liquidity sources to generate an output rate that can be transacted upon. Specifically, the system and method calculate a best bid/offer rate from input rates provided by multiple liquidity sources and apply a target spread and minimum profit to the best bid/offer rate to generate an optimal output rate. The optimal output rate may be a function of many factors, including market conditions, customer credit, and the preferences of the market maker or broker.

8 Claims, 3 Drawing Sheets

SYSTEM AND METHOD FOR CALCULATING OPTIMAL RATES IN A MULTI-SOURCE PRICE ENGINE IN OVER THE COUNTER MARKETS

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 7,627,520. The reissue applications are U.S. application Ser. No. 13/462,521 (the present Divisional Reissue Application, filed on May 2, 2012), U.S. application Ser. No. 13/462,526 (a Divisional Reissue Application, filed on May 2, 2012), and U.S. application Ser. No. 13/197,209 (a Reissue Application, filed on Aug. 3, 2011), all of which are reissues of U.S. Pat. No. 7,627,520.*

*This application is a Divisional Reissue Application of U.S. application Ser. No. 13/197,209, filed on Aug. 3, 2011, entitled "SYSTEM AND METHOD FOR CALCULATING OPTIMAL RATES IN A MULTI-SOURCE PRICE ENGINE IN OVER THE COUNTER MARKETS," which is a Reissue Application of U.S. Pat. No. 7,627,520 issued on Dec. 1, 2009, entitled "SYSTEM AND METHOD FOR CALCULATING OPTIMAL RATES IN A MULTI-SOURCE PRICE ENGINE IN OVER THE COUNTER MARKETS." This application is related to U.S. application Ser. No. 13/462,526, filed on May 2, 2012, a Divisional Reissue Application of U.S. application Ser. No. 13/197,209, filed on Aug. 3, 2011, entitled "SYSTEM AND METHOD FOR CALCULATING OPTIMAL RATES IN A MULTI-SOURCE PRICE ENGINE IN OVER THE COUNTER MARKETS," each of which is hereby incorporated by reference herein in its entirety.*

TECHNICAL FIELD

The technical field relates to computer-based systems for trading financial instruments, and, in particular, to a system and method for calculating optimal rates in a multi-source price engine in over the counter (OTC) markets.

BACKGROUND

Financial or commodities instruments may be traded in government regulated exchanges and cleared through regulated clearing monopolies such as the National Securities Clearing Corporation (NSCC) (for equities), the Options Clearing Corporation (OCC) (for equity options), or the Government Securities Clearing Corporation (GSCC) (for treasury bonds). In contrast, instruments for which no central clearing solution exists are traded "OTC" or "Over the counter." OTC products are traded and settled through multiple independent venues, introducing settlement risk and therefore affecting the marketability of prices as a function of the credit worthiness of the participants. Because settlement risk varies by participant, different participants have access to different rates in an OTC market. For example, most debt instruments are traded OTC with investment banks that make markets in specific issues. If a customer wants to buy or sell a bond, he or she will contact the bank that makes a market in that bond and ask for quotes. Many instruments, including forwards, swaps, currencies, and other types of derivatives are also traded OTC. In these OTC markets, large financial institutions typically serve as dealers, i.e., market makers. In an OTC market, a fair price is typically defined by what a willing buyer will pay and what a willing seller will accept.

A market maker typically provides a pair of prices to its customers, i.e., bid and offer prices. The bid price is the price the market maker is willing to buy from a customer, whereas the offer price is the price the market maker is willing to sell to a customer. The bid price is typically lower than the offer price, providing a spread, i.e., profit for the market maker.

In an OTC market, a market maker may trade instruments traditionally, e.g., by phone, or electronically, e.g., using a service provider. A service provider, such as Currenex (www.currenex.com) or EBS (www.ebs.com), typically provides one or more electronic communications networks (ECN), i.e., trading exchange platforms, for market makers to trade instruments electronically in an OTC market. A market maker may deal in multiple platforms. Likewise, a service provider may support multiple market makers through multiple liquidity pools (also referred to as exchange platforms, exchanges, exchange markets).

In addition to market makers, there are intermediaries called brokers that often aggregate liquidity from several liquidity sources. Many brokers have their own customers and act as a counterparty for both their customers and their liquidity sources. For these brokers each transaction results in two trades; one with their customer; the other with their liquidity source. Because brokers typically have access to multiple liquidity sources, they have superior pools of liquidity to draw upon for generating prices to their customers, enabling some brokers to mark up the price they receive from their liquidity sources, resulting in a profit when they deal with their customers.

Current service providers do not offer intelligent methods of defining and applying an optimal spread for market makers and brokers. When a preferred spread is two pips, for example, and an input rate offered by a market maker is 49/50, currently service providers will simply add one pip to each side, i.e., the bid price and offer price (e.g., 48/51). A pip is typically the minimum fluctuation or smallest increment of price movement. No intelligent method is offered to maximize profits for market makers and brokers.

SUMMARY

A computer implemented method for calculating optimal rates in a multi-source price engine in over the counter (OTC) markets includes accepting rates provided by a plurality of market makers, inputting the rates as base rates to a price calculation module. Each base rate including a base bid rate and a base offer rate. The method further includes calculating a best bid/offer rate from the base rates. The best bid/offer rate includes a calculated highest bid rate and a calculated lowest offer rate selected from the base rates available at an instant, and a difference between the calculated lowest offer rate and the calculated highest bid rate is a best bid/offer spread. The method further includes calculating a target best bid/offer rate by applying a target spread to the best bid/offer rate. A difference between a target best offer rate and a target best bid rate is equal to the target spread. The method calculates the target best bid/offer rate by comparing the target spread with best bid/offer spread. If the best bid/offer spread is less than the target spread, the method includes creating the target best bid/offer rate by adjusting the best bid/offer rate so that the difference is equal to the target spread. The method further includes generating output rates based on the target best bid/offer rate so that each output rate is equal to the target best bid/offer rate or has an output spread greater than the target spread.

A system for calculating optimal rates in a multi-source price engine in OTC markets includes a price integration layer that accepts rates from price engines in a plurality of market makers and sends the rates as base rates to a price calculation module. The system further includes a price calculation module that accepts the base rates from the price integration layer. Each base rate includes a base bid rate and a base offer rate. The price calculation module calculates a best bid/offer rate from the base rates. The best bid/offer rate includes a calculated highest bid rate and a calculated lowest offer rate selected from the base rates available at an instant. A difference between the calculated lowest offer rate and the calculated highest bid rate is a best bid/offer spread. The price calculation module calculates a target best bid/offer rate by applying a target spread to the best bid/offer rate. A difference between a target best offer rate and a target best bid rate is equal to the target spread. The price calculation module calculates the target best bid/offer rate by comparing the target spread with best bid/offer spread. If the best bid/offer spread is less than the target spread, the price calculation module creates the target best bid/offer rate by adjusting the best bid/offer rate so that the difference is equal to the target spread. The price calculation module further generates output rates based on the target best bid/offer rate so that each output rate is equal to the target best bid/offer rate or has an output spread greater than the target spread. The system further includes a network connecting the price calculation module with the price engines.

A computer readable medium provides instructions for calculating optimal rates in a multi-source price engine in OTC markets. The instructions include accepting rates provided by a plurality of market makers, inputting the rates as base rates to a price calculation module. Each base rate including a base bid rate and a base offer rate. The instructions further include calculating a best bid/offer rate from the base rates. The best bid/offer rate includes a calculated highest bid rate and a calculated lowest offer rate selected from the base rates available at an instant, and a difference between the calculated lowest offer rate and the calculated highest bid rate is a best bid/offer spread. The instructions further include calculating a target best bid/offer rate by applying a target spread to the best bid/offer rate. A difference between a target best offer rate and a target best bid rate is equal to the target spread. The instructions for calculating the target best bid/offer rate include comparing the target spread with best bid/offer spread. If the best bid/offer spread is less than the target spread, the instructions include creating the target best bid/offer rate by adjusting the best bid/offer rate so that the difference is equal to the target spread. The instructions further include generating output rates based on the target best bid/offer rate so that each output rate is equal to the target best bid/offer rate or has an output spread greater than the target spread.

DESCRIPTION OF THE DRAWINGS

Exemplary embodiments of the system and method for calculating optimal rates in a multi-source price engine in over the counter (OTC) markets will be described in detail with reference to the following figures, in which like numerals refer to like elements, and wherein.

DETAILED DESCRIPTION

A system and method calculate optimal rates in a multi-source price engine in over the counter (OTC) markets. The system and method integrate rates from multiple liquidity sources (i.e., price engines) to generate an output rate that can be transacted upon. The system and method apply a target spread and minimum profit to the base rates to generate an output rate. The target spread may be a function of many factors, including market conditions, customer credit, and the preferences of the price providers (e.g., market makers and brokers). Customers with a good credit may be configured on servers with small target spreads, whereas customers with a relatively bad credit may have greater target spreads.

The system and method create a price stream with optimal profitability rates for market makers and/or brokers by maximizing a first spread between the rate that is published to a customer and the rate at which a deal can be executed. At the same time, in order to maintain the competitiveness of the rates so that customers are likely to deal on them, the system and method minimize a second spread, which is the spread between the bid and offer prices. In effect, the system and method strike a compromise between maximizing profits for the market makers and/or brokers and offering customers a competitive spread.

The system and method are described in the context of OTC markets for illustration purposes only. One skilled in the art will appreciate that the system and method can be applied to any asset class.

Figure 1:
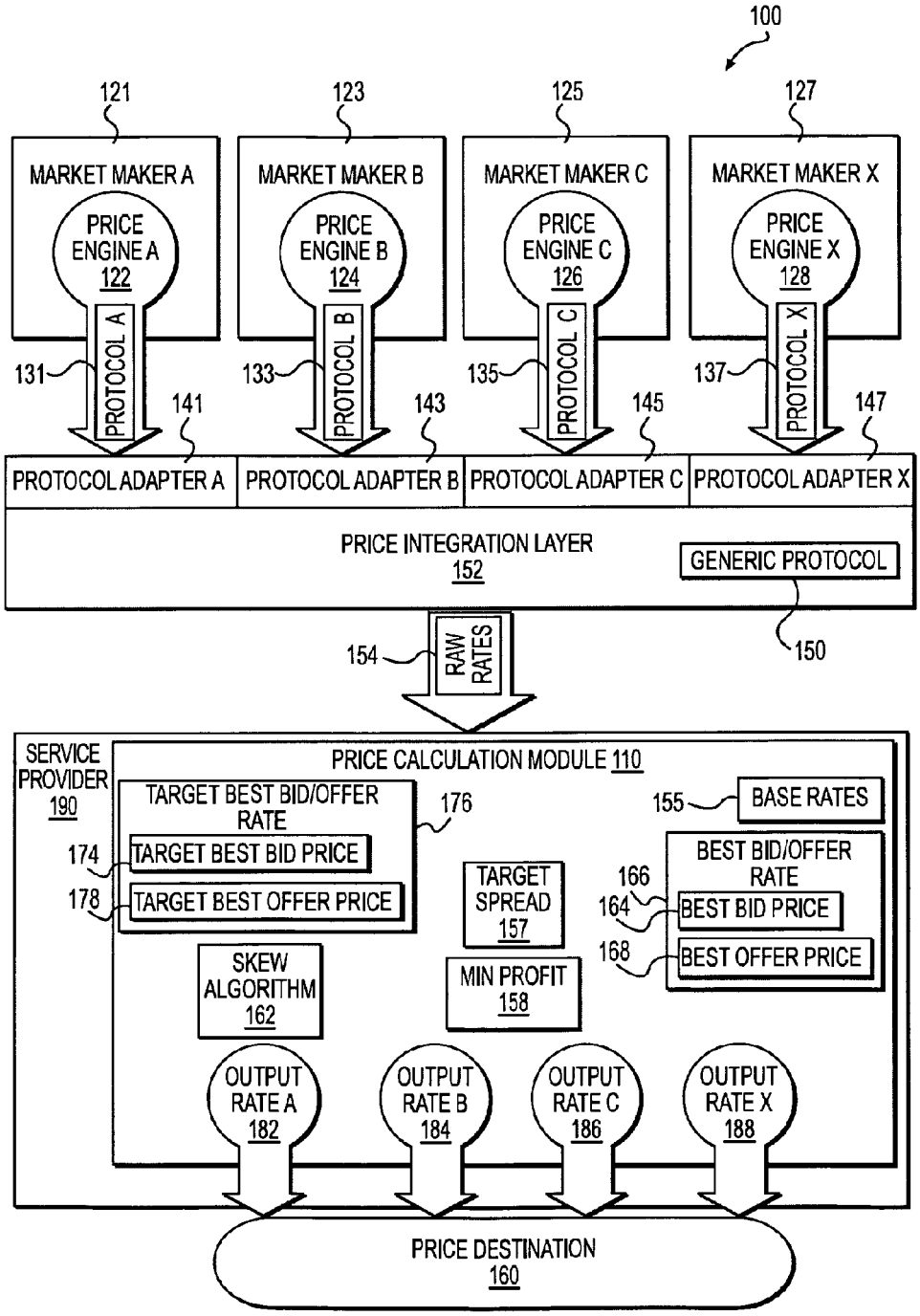
FIG. 1 illustrates an embodiment of a system for calculating optimal rates in a multi-source price engine in OTC markets.

FIG. 1 illustrates an embodiment of a system 100 for calculating optimal rates in a multi-source price engine in OTC markets. As noted above, a service provider 190 typically provides one or more electronic communications networks (ECN) (also referred to as trading exchange platforms, exchange markets, or liquidity pools) for market makers 121, 123, 125, 127 to trade instruments electronically in an OTC market. The market makers 121, 123, 125, 127 typically use price engines 122, 124, 126, 128 to provide bid and offer prices, i.e., bid and offer rates, electronically using various protocols 131, 133, 135, 137. The service provider 190 may have protocol adapters 141, 143, 145, 147 for each protocol 131, 133, 135, 137 to convert prices or rates offered in a market maker's specific protocol to a generic protocol 150 in a price integration layer 152.

The system 100 includes a price calculation module 110 that accepts bid and offer prices, i.e., raw rates 154, provided by different market makers 121, 123, 125, 127. After the raw rates 154 are input into the price calculation module 110 in a uniform format, they are referred to as base rates 155. The base rates 155 are not aggregated and may be used in the calculation of a best bid/offer rate 166. The best bid/offer rate 166 may be the calculated highest bid rate (i.e., best bid price 164) and lowest offer rate (i.e., best offer price 168) selected from the available base rates 155 at a given instant.

Next, the system 100 may apply a target spread 157 to the best bid/offer rate 166. A spread is typically the difference between the bid and offer prices of a security instrument. The target spread 157, an input amount, is typically the spread that would be considered competitive to customers for a given financial instrument at a time of day. Each individual instrument typically has a target spread 157 that can be automatically adjusted on a time zone basis. The target spread 157 may be stored in a database, and multiple records may exist representing the target spread 157 for a specific time range within the day. The system 100 may automatically adjust the target spread 157 throughout the day to accommodate natural changes in market liquidity. For example, a rate for euros versus dollars (EUR/USD) at 2300 Greenwich Mean Time (GMT) typically has a greater spread than at 1400 GMT because both European and American traders are generally not trading at that time. The target spread 157 may be manually input into the price calculation module 110 by, e.g., an operator using a graphical user interface (GUI).

If the best offer price 168 minus the best bid price 164 is less than the target spread 157 for an instrument, a target best bid/offer rate 176 is created, by distributing the difference in the spread as evenly as possible to the best bid price 164 and the best offer price 168, so that a target best offer price 178 minus a target best bid price 174 is equal to the target spread 157. Output rates 182, 184, 186, 188 may be calculated by applying the target best bid/offer rate 176 to the base rates 155 so that each output rate is equal to the target best bid/offer rate 176 or has an output spread greater than the target spread 157. If the best offer price 168 minus the best bid price 164 is greater than or equal to the target spread 157, no adjustments are made.

The system 100 may also apply a minimum profit 158 to the output rates 182, 184, 186, 188 after the output rates 182, 184, 186, 188 satisfy the target spread 157. The minimum profit 158 is also an input that can be manually input into the price calculation module 110 by an operator. Applying the minimum profit 158 may widen the spread between the bid and offer prices. Similar to the target spread 157, the minimum profit 158 can be automatically adjusted on a time zone basis or other basis, to accommodate changes in market liquidity.

The system 100 may use a skew algorithm 162, a skewing methodology, to satisfy the target spread 157 and the minimum profit 158. Market conventions typically limit the number of decimal places that can be used to price a particular instrument. Therefore, it is not always possible to evenly distribute a spread between the bid and offer prices. Specifically, if an even number of pips are to be added or subtracted from the bid and offer prices, an even amount can be distributed among the bid and offer prices. However, if an odd number is to be added or subtracted, e.g., "1," adding "½" to both the bid and offer prices would effectively add an additional decimal place, which is not acceptable to certain market conventions. Accordingly, a skew algorithm 162 may be used to determine whether to subtract the remaining pip from the bid price or add it to the offer price. In short, the skew algorithm 162 determines how to apply the spread, e.g., which side of the market price is the optimal side to apply a remaining pip. Alternatively, fractional-pips may be evenly applied to the bid and offer prices to achieve the target spread 157 and/or the minimum profit 158.

The system 100 may use the following exemplary skew algorithms 162 to distribute the remaining pip of an odd number of pips: "Static Bid" always subtracts a pip from the bid price; "Static Offer" always adds a pip to the offer price; "Last" applies a pip to the side that has the last trade; "Random" applies a pip randomly to the bid or offer price, (randomization may be changed when there is a change in the best bid or offer price); "Moving Average" is a stochastic algorithm that adds a pip to the offer price as the markets are trending upwards, and subtracts the odd spread from the bid price when the markets are trending down; and "Inverted Moving Average" is a stochastic algorithm that subtracts a pip from the bid price as the markets are trending upwards, and adds the odd spread to the offer price as the markets are trending down. One skilled in the art will appreciate that other types of skew algorithms 162 may be used in connection with the system 100.

The price calculation module 110 calculates an executable output rate 182, 184, 186, 188. The price calculation module 110 may also rearrange the ordering of the output rates 182, 184, 186, 188 so that the rates are ordered in the most profitable way. For example, the rates that have been adjusted based on the target spread 157 and the minimum profit 158 may be moved forward so that these adjusted rates are seen by customers before other unadjusted rates. This is particularly important to brokers because they can easily realize a profit from the adjustments by dealing with the counterparty providing the source of the rates at a better price (e.g., raw rates) than the price (e.g., adjusted rates) at which they deal with their customers. These output rates 182, 184, 186, 188 may be sent to a price destination 160, which may be a matching service, a customer, a screen, or any other destinations for the rates to be executed.

The following examples illustrates the operation of the system 100. The target spread 157 is, e.g., two pips, and the minimum profit 158 is, e.g., one pip, for an instrument. As noted above, a pip is typically the minimum fluctuation or smallest increment of price movement. The minimum profit 158 of one pip indicates that the market maker or broker at least makes a profit of one pip when their customers deals on the side (bid or offer) that the pip is applied. If the system 100 determines that the best bid/offer rate 166 is, e.g., 95/96, the best bid/offer spread is one pip and is less than the target spread 157. The system 100 may either subtract one pip from the best bid price or add one pip to the best offer price, depending on the skew algorithm 162 to create the target best bid/offer rate 176. The target best/bid offer rate then becomes 94/96 or 95/97.

If, for example, the system 100 determines that the best bid/offer rate is 93/96, the best bid/offer spread is three pips and is greater than the target spread 157. In other words, the target spread 157 of two pips has been satisfied. In order to satisfy the minimum profit 158 of one pip, the system 100 may either subtract one pip from each base bid rate 155 or add one pip to each base offer rate 155, depending on the skew algorithm 162.

If the system 100 determines that the best bid/offer rate is, e.g., 95/94, an inverted rate where the bid price is greater than the offer price, the system 100 may distribute three pips to create the target best bid/offer rate 176.

The following example further illustrates the operation of the system 100. The base rates 155 are shown in bid/offer format with a letter representing each number.

50a/51b
50c/52d
49e/51f
49g/52h

In this example, the target spread 157 driven by the market is three pips, the minimum profit 158 is one pip, and the skew methodology is "Static Offer." The price calculation module 110 first determines the best bid/offer rate 166 (i.e., the best bid price 164 and the best offer price 168) from the available base rates 155. The best bid price 164 in this example is 50 and the best offer price 168 is 51. Next, the price calculation module 110 applies the target spread 157 to the best bid/offer rate 166 to create the target best bid/offer rate 176 of 49 bid and 52 offer. Next, the price calculation module 110 applies the target best bid/offer rate 176 and the minimum profit 158 to the base rates 155 to derive the output rates 182, 184, 186, 188 as follows:

49a/52b
49c/52f
49e/52d
49g/53h

As shown above, the output rates 182, 184, 186, 188 are rearranged so that the rates are ordered in the most profitable way. In other words, the output rates that have been adjusted, referred to as adjusted output rates, are moved forward so that these adjusted output rates are dealt upon by customers before any unadjusted rates. For example, a customer deals on b and f before seeing d and h.

Figure 2:
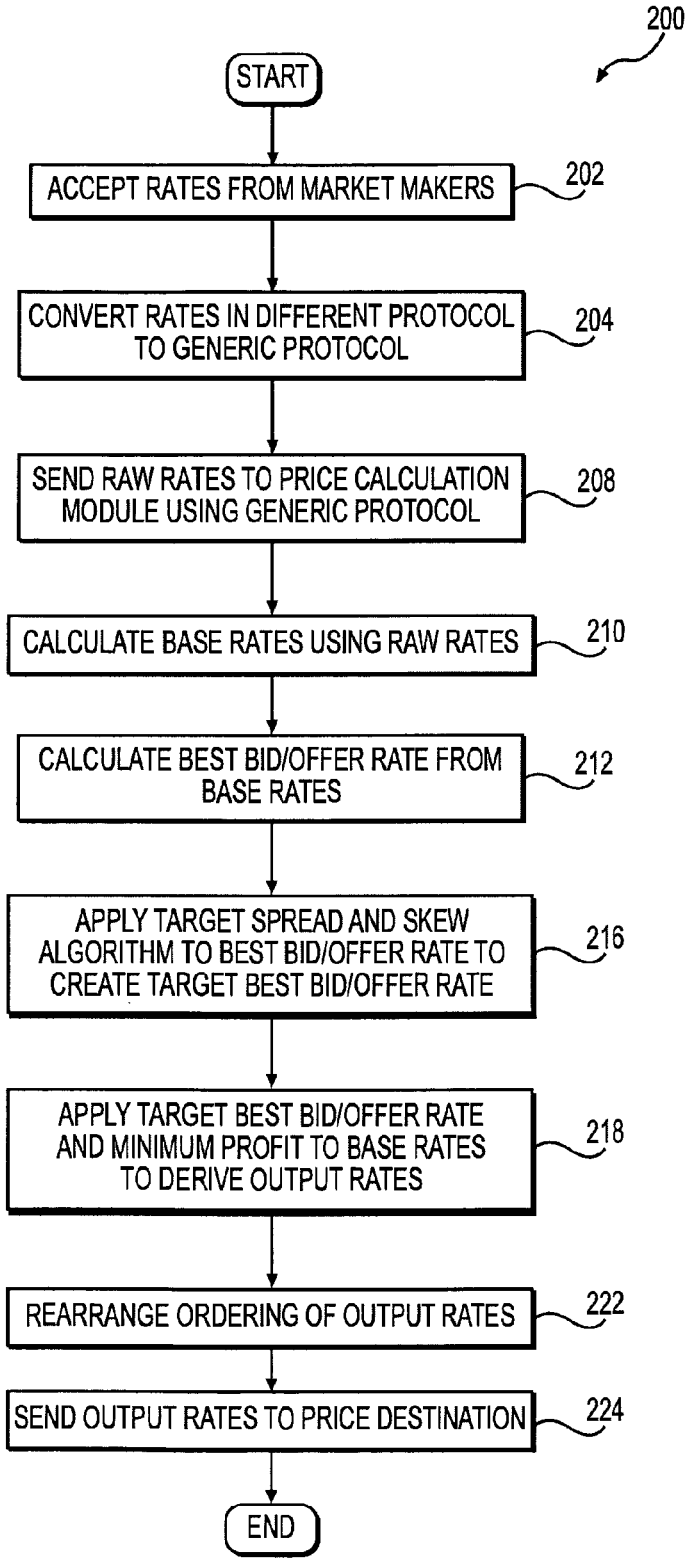
FIG. 2 is a flow chart illustrating an embodiment of a method for calculating optimal rates in a multi-source price engine in OTC markets.

FIG. 2 is a flow chart illustrating an embodiment of a method 200 for calculating optimal rates in a multi-source price engine in OTC markets. Each liquidity source, i.e., price engine, at each market maker, may have different bid and offer prices at any instant. Each market maker 121, 123, 125, 127 may use a different protocol 131, 133, 135, 137 to send these bid and offer prices, also referred to as raw rates 154, to the service provider 190 (block 202). The service provider 190 may use protocol adapters 141, 143, 145, 147 to convert the raw rates 154 in different protocols 131, 133, 135, 137 to a generic protocol 150 at the price integration layer 152 (block 204). The raw rates 154 may be input into the price calculation module 110 using the generic protocol 150 (block 208).

The price calculation module 110 then calculates the base rates 155 based on the raw rates 154 by converting them to a uniform format (block 210). The time zone algorithm automatically adjusts the target spread 157 and the minimum profit 158 throughout the day to accommodate natural changes in market liquidity. Next, the method 200 calculates a best bid/offer rate 166, which is the calculated highest bid rate (i.e., best bid price 164) and lowest offer rate (i.e., best offer price 168) selected from the available base rates 155 at a given instant (block 212). The price calculation module 110 applies the target spread 157, skew algorithm 162 to the best bid/offer rate 166 to create the target best bid/offer rate 176 (block 216). The price calculation module 110 applies the target best bid/offer rate 176, the minimum profit 158, and the skew algorithm 162 to the base rates 155 to derive output rates 182, 184, 186, 188 (block 218). Next, the price calculation module 110 rearranges the ordering of the output rates 182, 184, 186, 188 so that the rates are ordered in the most profitable way (block 222) and sends the output rates 182, 184 186, 188 to the price destination 160 (block 224).

Figure 3:
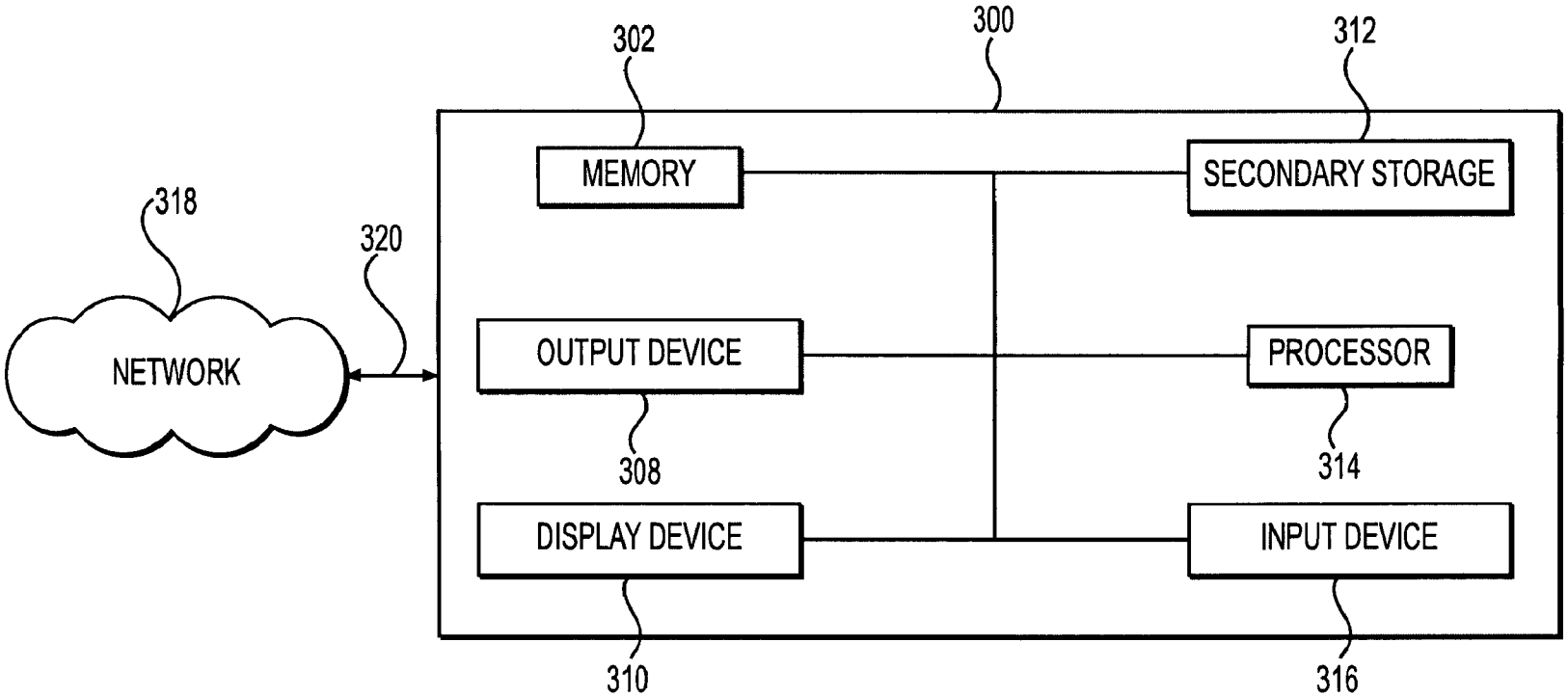
FIG. 3 illustrates exemplary hardware components of a computer that may be used in connection with an exemplary method for calculating optimal rates in a multi-source price engine in OTC markets.

FIG. 3 illustrates exemplary hardware components of a computer 300 that may be used in connection with the method for calculating optimal rates in a multi-source price engine in OTC markets. The computer 300 includes a connection 320 with a j network 318 such as the Internet or other type of computer or telephone network. For example, the network 318 connects the price calculation module 110 with the price engines 122, 124, 126, 128 from different market makers 121, 123, 125, 127. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute instructions to perform the method steps described herein. These instructions may be stored in the memory 302, the secondary storage 312, or received from the Internet or other network 318. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the method for calculating optimal rates in a multi-source price engine in OTC markets are described as being stored in memory, one skilled in the art will appreciate that these aspects can also be stored on or read from other types of computer program products or computer-readable media, such as secondary storage devices, including hard disks, floppy disks, or CD-ROM; a signal embodied in a carrier wave from the Internet or other network; or other forms of RAM or ROM. The computer-readable media may include instructions for controlling the computer 300 to perform a particular method.

While the system and method for calculating optimal rates in a multi-source price engine in OTC markets have been described in connection with an exemplary embodiment, those skilled in the art will understand that many modifications in light of these teachings are possible, and this application is intended to cover variations thereof.

What is claimed is:

[1. A computer implemented method for calculating optimal rates in a multi-source price engine in over the counter (OTC) markets, the method being executed by a computer system, the method comprising:

accepting, at the computer system, rates provided by a plurality of market makers;

inputting, at the computer system, the rates as base rates, wherein each base rate includes a base bid rate and a base offer rate;

calculating, by the computer system, a best bid/offer rate from the base rates by selecting a highest bid rate from the base bid rate inputted for each of the base rates at an instant and selecting a lowest offer rate from the base offer rate inputted for each of the base rates at an instant;

calculating a best bid/offer spread as a difference between the lowest offer rate and the highest bid rate;

retrieving from a database, by the computer system, a target spread;

calculating, by the computer system, a target best bid/offer rate by applying the target spread to the best bid/offer rate, wherein a difference between a target best offer rate and a target best bid rate is equal to the target spread, wherein the step of calculating by the computer system, the target best bid/offer rate includes:

comparing, by the computer system, the target spread with the best bid/offer spread;

when the best bid/offer spread is less than the target spread, creating, by the computer system, the target best bid/offer rate by automatically adjusting the best bid/offer rate so that the difference is equal to the target spread; and generating, by the computer system, output rates based on the target best bid/offer rate so that each output rate is equal to the target best bid/offer rate or has an output spread greater than the target spread.]

[2. The method of claim 1, further comprising if there is an odd number of pips between the target spread and the best bid/offer spread, using a skew algorithm to determine whether to subtract one pip from the target best bid rate or to add the one pip to the target best offer rate of the target best bid/offer rate to make a target best bid/offer spread equal to the target spread.]

[3. The method of claim 2, wherein the skew algorithm is selected from a group consisting of a static bid algorithm, a static offer algorithm, a last algorithm, a random algorithm, a moving average algorithm, and an inverted moving average algorithm.]

[4. The method of claim 1, further comprising if there is an odd number of pips between the target spread and the best bid/offer spread, evenly applying fractional-pips to the target best bid rate and the target best offer rate to make a target best bid/offer spread equal to the target spread.]

[5. The method of claim 1, further comprising applying a minimum profit to the base offer rate and the base bid rate, the minimum profit being applied to every base rate to ensure that there is an output rate for each base bid rate and base offer rate such that half of the minimum profit is applied to each base rate, the applying the minimum profit step including:

for each base bid rate creating or adjusting an output rate if necessary by subtracting half of the minimum profit from the base bid rate; and for each base offer rate creating or adjusting the output rate if necessary by adding half of the minimum profit from the base offer rate.]

[6. The method of claim 5, further comprising if there is an odd number of pips specified in a minimum profit, using a skew algorithm to determine whether to subtract a remaining pip from the base bid rate or to add the remaining pip to the base offer rate to achieve a minimum profit.]

[7. The method of claim 6, wherein the skew algorithm is selected from a group consisting of a static bid algorithm, a static offer algorithm, a last algorithm, a random algorithm, a moving average algorithm, and an inverted moving average algorithm.]

[8. The method of claim 5, further comprising if there is an odd number of pips specified to achieve a minimum profit, evenly applying fractional-pips to the base bid rate and the base offer rate to achieve the minimum profit.]

[9. The method of claim 1, further comprising sending the output rates to a price destination.]

[10. The method of claim 1, wherein the generating the output rates step comprises:

if the base bid rate is greater than the target best bid rate, generating an output rate where an output bid rate is equal to the target best bid rate; and if the base offer rate is less than the target best offer rate, generating an output rate where an output offer rate is equal to the target best offer rate.]

[11. The method of claim 1, wherein the generating the output rates step comprises:

if the target best bid rate is less than the best bid rate, generating an output rate where an output bid rate subtracts a number of pips from the base bid rate equal to a difference between the best bid rate and the target best bid rate if the target offer rate is more than the target best offer rate, generating an output rate where an output offer rate adds a number of pips to the base offer rate equal to a difference between the target best offer rate and the best offer rate.]

[12. The method of claim 11, wherein the target best bid/offer rate embodies both the target spread and a minimum profit.]

[13. The method of claim 1, further comprising rearranging the output rates in a profitable way for the market makers and/or brokers so that a customer is presented with an adjusted rate before seeing an unadjusted rate.]

[14. The method of claim 1, further comprising sending unadjusted base rates to a price destination if the best bid/offer spread is greater than the target spread, and there are no adjustments for minimum profit.]

[15. The method of claim 1, further comprising when the best bid/offer spread is equal to the target spread, and there are no adjustments for minimum profit, sending unadjusted base rates to a price destination.]

[16. The method of claim 1, further comprising converting the rates provided in different protocols to a generic protocol.]

[17. A system for calculating optimal rates in a multi-source price engine in over the counter (OTC) markets, comprising:

a processor of a computer system configured to accept rates from price engines in a plurality of market makers and configured to input the rates as base rates, wherein each base rate includes a base bid rate and a base offer rate, wherein the processor is configured to:

calculate a best bid/offer rate from the base rates by selecting a highest bid rate from the base bid rate inputted for each of the base rates at an instant and selecting a lowest offer rate from the base offer rate inputted for each of the base rates at an instant;

calculate a best bid/offer spread as a difference between the lowest offer rate and the highest bid rate;

retrieve from a database a target spread;

calculate a target best bid/offer rate by applying the target spread to the best bid/offer rate, wherein a difference between a target best offer rate and a target best bid rate is equal to the target spread, wherein the processor calculates the target best bid/offer rate by comparing the target spread with the best bid/offer spread and when the best bid/offer spread is less than the target spread, the processor creates the target best bid/offer rate by automatically adjusting the best bid/offer rate so that the difference is equal to the target spread; and generate output rates based on the target best bid/offer rate so that each output rate is equal to the target best bid/offer rate or has an output spread greater than the target spread; and a network connecting the computer system with the price engines.]

[18. The system of claim 17, wherein the target spread is input into the processor by an operator suing a graphical user interface (GUI).]

[19. The system of claim 17, wherein the target spread is a spread that is competitive to customers for a financial instrument at a time of day.]

[20. The system of claim 17, wherein the target spread is automatically adjusted on a time zone basis.]

[21. The system of claim 17, wherein if there is an odd number of pips between the target spread and the best bid/offer spread, the processor is configured to use a skew algorithm to determine whether to subtract one remaining pip from the target best bid rate or to add the one remaining pip to the target best offer rate of the target best bid/offer rate to make a target best bid/offer spread equal to the target spread.]

[22. The system of claim 21, wherein the skew algorithm is selected from a group consisting of a static bid algorithm, a static offer algorithm, a last algorithm, a random algorithm, a moving average algorithm, and an inverted moving average algorithm.]

[23. The system of claim 17, wherein the processor is configured to apply a minimum profit to the base rates.]

[24. The system of claim 17, wherein the processor is configured to send the output rates to a price destination.]

[25. The system of claim 17, wherein the processor is configured to rearrange the output rates in a profitable way for the market makers and/or brokers so that a customer is presented with an adjusted rate before seeing an unadjusted rate.]

[26. The system of claim 17, wherein the processor is configured to rearrange the output rates in a profitable way for a broker so that a customer is presented with an adjusted rate before seeing an unadjusted rate., wherein the broker deals with the customer at the adjusted rate and deals with a liquidity source at a raw rate to realize a profit.]

[27. The system of claim 17, wherein when the best bid/offer spread is greater than the target spread, and there are no adjustments for minimum profit, the processor is configured to send unadjusted base rates to a price destination.]

[28. A computer readable medium having executable instructions which when executed cause a computer to perform steps comprising:

accepting rates provided by a plurality of market makers;

inputting the rates as base rates, wherein each base rate includes a base bid rate and a base offer rate;

calculating a best bid/offer rate from the base rates by selecting a highest bid rate from the base bid rate inputted for each of the base rates at an instant and selecting a lowest offer rate from the base offer rate inputted for each of the base rates at an instant;

calculating a best bid/offer spread as a difference between the lowest offer rate and the highest bid rate;

retrieving from a database a target spread;

calculating a target best bid/offer rate by applying the target spread to the best bid/offer rate, wherein a difference between a target best offer rate and a target best bid rate is equal to the target spread, wherein calculating the target best bid/offer rate includes:

comparing the target spread with the best bid/offer spread;

when the best bid/offer spread is less than the target spread, creating the target best bid/offer rate by automatically adjusting the best bid/offer rate so that the difference is equal to the target spread; and generating output rates based on the target best bid/offer rate so that each output rate is equal to the target best bid/offer rate or has an output spread greater than the target spread.]

[29. The computer readable medium of claim 28, further comprising instructions for:

if there is an odd number of pips between the target spread and the best bid/offer spread, using a skew algorithm to determine whether to subtract one pip from the target best bid rate or to add the one pip to the target best offer rate of the target best bid/offer rate to make a target best bid/offer spread equal to the target spread.]

[30. The computer readable medium of claim 28, further comprising instructions for applying a minimum profit to the base rates to widen a spread between the base offer rate and the base bid rate.]

[31. The computer readable medium of claim 28, further comprising instructions for sending unadjusted base rates to a price destination when the best bid/offer spread is greater than the target spread and there are no adjustments for minimum profit.]

*32. A computer implemented method for calculating preferred rates in a multi-sourced price engine for use in pricing securities for trading, the method being executed by a computer system, the method comprising:*

*(a) the computer system receiving in an automated manner electronic streaming data from at least one pricing engine from each of a plurality of market makers, with the electronic streaming data being generated by each pricing engine including at least bid and offer rates for securities for which a particular market maker creates at least one market;*

*(b) the computer system processing the bid and offer rates received at step (a) by generating a base bid rate and a base offer rate using the bid and offer rates received at step (a);*

*(c) the computer system calculating a best bid/offer rate from the base rates generated at step (b) by selecting at an instant a highest bid rate and a lowest offer rate from the plurality of base bid rates and the plurality of offer rates generated at step (b);*

*(d) the computer system calculating a best bid/offer spread as a difference between the highest bid rate and the lowest offer rate determined at step (c);*

*(e) the computer system retrieving from a database a target spread;*

*(f) the computer system calculating a target best bid/offer rate by applying the target spread to the best bid/offer rate so that a difference between the target best offer rate and the target best bid rate is equal to the target spread, with the step (f) applying the target spread to calculate the target best bid/offer rate including,*

*(1) comparing the target spread with the best bid/offer spread and when the best bid/offer spread is equal to or greater than the target spread assigning the best bid/offer rate as the target best bid/offer rate and then step (g), otherwise then step (f)(2),*

*(2) creating the target best bid/offer rate by adjusting in an automated manner the best bid/offer rate spread to equal the target spread, and then step (g);*

*(g) the computer system generating output rates based on the target best bid/offer rate calculated at step (f); and*

*(h) the computer system outputting output rates generated at step (g) as streaming preferred rates.*

*33. The computer-implemented method as recited in claim 32, wherein step (f) further includes adjusting the best bid/offer rate to calculate the target best bid/offer rate by evenly distributing the target spread to the best bid rate and best offer rate in calculating the best bid/offer rate spread to equal the target spread when there are an even number of minimum measurement units in adjusting the best bid/offer rate spread to equal the target spread.*

*34. The computer-implemented method as recited in claim 32, wherein step (f) further includes adjusting the best bid/offer rate to calculate the target best bid/offer rate by distributing the target spread to the best bid rate and best offer rate according to a skew algorithm that is selected from a group consisting of a static bid algorithm, a static offer algorithm, a last algorithm, a random algorithm, a moving average algorithm, and an inverted moving average algorithm when there are an odd number of minimum measurement units in adjusting the best bid/offer rate spread to equal the target spread.*

*35. The computer-implemented method as recited in claim 32, wherein the method further includes increasing the target spread by a predetermined profit margin to generate a second target spread.*

*36. The computer-implemented method as recited in claim 35, wherein step (f) further includes adjusting the best bid/*

*offer rate to calculate the target best bid/offer rate by evenly distributing the second target spread to the best bid rate and best offer rate in calculating the best bid/offer rate spread to equal the second target spread when there are an even number of minimum measurement units in adjusting the best bid/offer rate spread to equal the second target spread.*

*37. The computer-implemented method as recited in claim 36, wherein step (f) further includes adjusting the best bid/offer rate to calculate the target best bid/offer rate by distributing the second target spread to the best bid rate and best offer rate according to a skew algorithm that is selected from a group consisting of a static bid algorithm, a static offer algorithm, a last algorithm, a random algorithm, a moving average algorithm, and an inverted moving average algorithm when there are an odd number of minimum measurement units in adjusting the best bid/offer rate spread to equal the second target spread.*

*38. The computer-implemented method as recited in claim 32, wherein step (f) further includes adjusting the best bid/offer rate to calculate the target best bid/offer rate by evenly distributing the target spread to the best bid rate and best offer rate when there are an odd number of minimum measurement units in adjusting the best bid/offer rate spread to equal the target spread by fractionally dividing the odd number of minimum measurement units in adjusting the best bid/offer rate spread to equal the target spread.*

*39. The computer-implemented method as recited in claim 32, wherein a market maker includes a liquidity source.*

* * * * *